May 13, 1924.　　　　　　　　　　　　　　　　1,493,992
H. KOPPERS
PROCESS FOR ZINC FURNACE OPERATION
Filed July 5, 1921
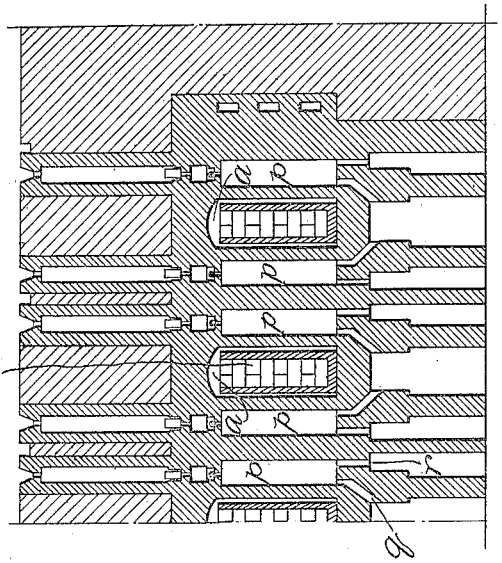
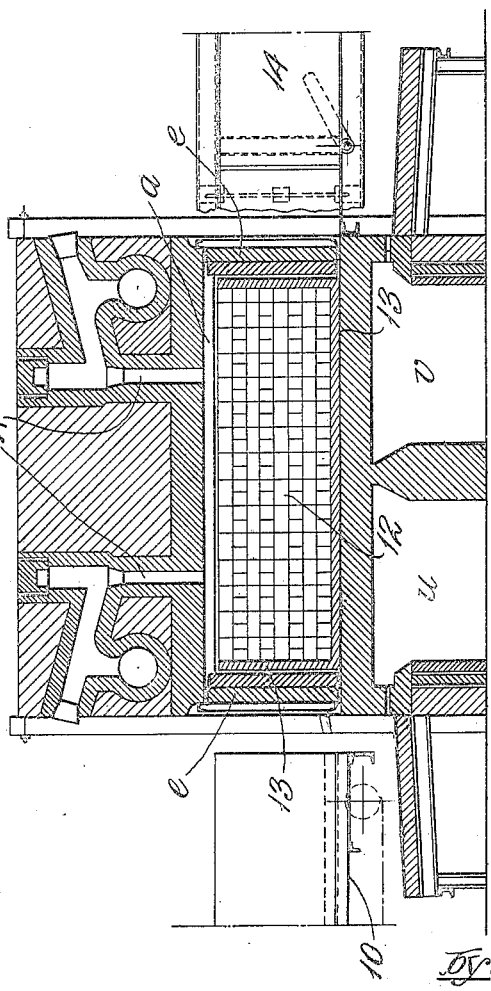
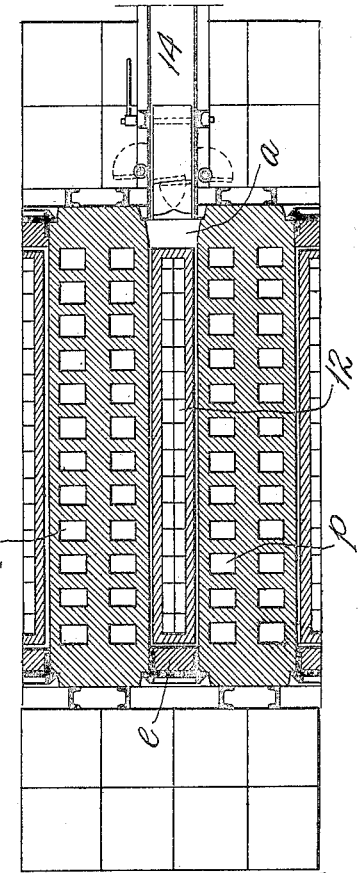
Inventor
Heinrich Koppers Patented May 13, 1924.

1,493,992

UNITED STATES PATENT OFFICE.

HEINRICH KOPPERS, OF ESSEN-RUHR, GERMANY, ASSIGNOR TO THE KOPPERS DEVELOPMENT CORPORATION, OF PITTSBURGH, PENNSYLVANIA, A CORPORATION OF PENNSYLVANIA.

PROCESS FOR ZINC-FURNACE OPERATION.

Application filed July 5, 1921. Serial No. 482,617.

*To all whom it may concern:*

Be it known that I, HEINRICH KOPPERS (assignor to The Koppers Development Corporation, a corporation of Pennsylvania), a citizen of Germany, residing in Essen-Ruhr, Germany, have invented a new and useful Improvement in Processes for Zinc-Furnace Operation (for which I filed application in Germany on or about May 28, 1918), of which the following is a specification.

The invention relates to a method of charging and operating ovens, ordinarily of large dimensions, for the reduction of zinc and similar volatile metals.

Heretofore it has been provided in operating ovens of large dimensions for the reduction of zinc ore and similar volatile metals to build up the oven charge outside the reduction chamber of the ovens. These charges are made up of many briquettes which are composed of zinc ore and cinder. These briquettes are stacked together and pushed into the reduction chamber. After the briquettes are positioned within the reduction chamber the space between the briquettes and the walls defining the chamber is filled with loose cinder to prevent the walls from being scorched. It is not entirely practical to operate ovens so filled because the uniform filling in of such loose cinder in the space between the briquettes and the heating walls is difficult to attain and also it is difficult to pack such unmixed cinder in accordance with the proper thickness and uniformity required. Such loose cinder is also a poor conductor of heat from the heating walls and consequently the transmission of such heat is impaired.

This invention relates to an embodiment particularly adapted to the carrying out of the method outlined above in an improved manner. In accordance with this invention, the charge that is built up of the different briquettes outside of the oven chamber is lined at the bottom and on the side surfaces with a layer of carbon bricks and is then introduced into the oven in much the same manner as is employed in charging by-product coke ovens with pressed cakes or blocks of carbonaceous material that is to be coked. This covering of the charge proper by means of the carbon bricks has the advantage that it can be prepared outside of the oven with all due care, so that the charge, especially at the bottom, is enclosed in carbon and therefore protected against direct contact with the retort wall. Furthermore, these carbon bricks have a further advantage, over loose cinder in that should the ashes enclosed in the carbon brick envelope liquefy the carbon bricks will not liquefy but remain solid and retain such liquefied ash and prevent the slag from making contact with the silica fireproof material. When loose cinder is used to prevent scorching of the oven walls, and the ashes liquify, the slag will press the loose cinder aside and make contact with the fireproof silica material. These carbon bricks are subjected to very heavy compression in their manufacture and as a result they possess, compared with loose cinder, a high degree of heat conductivity which is of particular importance in view of the high temperature required for zinc reduction.

The removal of the residue of the charge in the oven is attended with many difficulties and inconveniences. When loose cinder is used the time required to discharge the contents of the oven is greater than is desirable and causes an undesired cooling of the oven chamber. The loose waste ashes resulting from the distillation operation cannot be readily pushed out of the oven and the loose waste ashes also allow some formation of slag on the walls of the oven. By building up the charge outside of the oven in an enclosure of carbon brick the entire charge may be built of the proper size consistent with the size of the oven and pushed into the oven as a unit. After the distillation operation is finished the entire oven charge may be pushed from the oven chamber in the same manner as coke is now pushed from by-product coke ovens. The ashes are retained within the envelope of carbon brick and never come in contact with the fireproof silica in the oven walls. These charges are pushed out onto a receiving rack which takes the charge, in the carbon brick envelopes, to the station at which the distilled material may be pressed out.

In the drawing forming a part of this application a form of embodiment of an apparatus suitable for performing the invention is shown, in Fig. 1 by a vertical longitudinal section, in Fig. 2 by a vertical cross section and in Fig. 3 by a horizontal section.

The oven chamber $a$ is inclosed by the heating or combustion chambers $p$ to which gas and air are supplied from the regenerators $u$ and $v$ through the ports $q$ and $r$. The chamber is closed at each end by the doors $e$ and has the gas outlets $k$ for the distilled gases and vapors. Outside of the chamber a charge is built up on the platform 10 from the zinc ore briquettes 12, this charge being covered at the bottom and on all side surfaces by a layer 13 of carbon bricks which have a thickness of from 6 to 8 centimeters. The charge as thus built up and ready for the distillation operation is then pushed into the oven chamber $a$ and subjected to the distillation operation after the doors $e$ have been secured in place at each end of the ovens.

After the distillation operation has been completed the doors $e$ are removed. A pushing ram is then inserted in the oven and against the end of the carbon brick wall of the charge and the charge is pushed out onto the receiving rack or receptacle 14. The receiving receptacle 14 is somewhat similar to a coke quenching device but is distinguished from said coke quenching device in that the charge is not quenched. This receptacle 14 is provided on the inside with clamps that exert pressure on the carbon bricks so that in discharging the ashes at any suitable location of the plant the carbon bricks are thereby held in position so as not to become mixed with the ashes being discharged. The carbon bricks remain unchanged during the distilling process and are not sensible to scorification by the basic ores and slag and thereby can be recovered and re-used for the same purpose. The residue of the distillation is at once blown into a shaft furnace or kiln and since the briquette shape is maintained or at least pieces of such briquettes remain the balance of the zinc that is not expelled in the distillation process is recovered as ZnO from the waste gases, and other metals such as iron and lead are recovered by their separating underneath the slag. If desired, additional coke may be supplied and blasted with heated air.

The above described process may be employed for treating other substances, such as marl, that is small grained lime which is obtained as wasted quarries; fine grained dolomite and magnesite as well as mine washings for the purpose of preparing them from mine refuse, and also to obtain by-products therefrom. This process may be employed to obtain by-products of materials and the removal of the ashes of substances that are difficult to remove from the ovens after distillation. Such fine grained substances would be poured into a receptacle built up of carbon bricks. This receptacle may if desired be erected in a box having the shape and dimensions of the oven chamber. This abovementioned receptacle I have described as made of carbon bricks, but it is to be understood that it may be made of material or substances other than carbon and in accordance with the nature of the material to be treated, an acid, basic or indifferent (neutral) lining may be used in connection therewith. After the box has been pushed in front of the oven opening, the contents, that is to say the receptacle built up from bricks, with the contained fine-grained material, is pressed into the oven chamber and burnt or distilled there. The pressing out is effected in the same manner as described above. In burning lime, dolomite and magnesite, the residue is the principal product; occasion arising, however, it is possible to catch the carbonic acid expelled in this connection. In treating mine-washings which are to be used for mine refuse, previous heating is necessary in order to avoid subsequent ignition in the mine, and here, of course, the catching of the valuable by-products is of special importance.

What is claimed is—

1. A method of operating large dimension ovens for the reduction of zinc and other similar volatile metals consisting in building up the charge outside the ovens in the form of briquettes, stacking said briquettes in the form of a cake of smaller dimensions than the oven, surrounding said cake on the sides which make contact with the oven with carbon bricks, pushing such charge into the oven and subjecting it to the distillation operation.

2. A method of operating large dimension ovens for the reduction of zinc and other similar volatile metals consisting in building up the charge outside the ovens in the form of briquettes, stacking said briquettes in the form of a cake of smaller dimensions than the oven, surrounding said cake on the sides which make contact with the oven with carbon bricks, pushing such charge into the oven and subjecting it to the distillation operation and discharging the distilled charge by applying a pusher ram to one end of the carbon envelope and pushing said charge bodily onto a receiving station.

3. A method of operating large dimension ovens for the reduction of zinc and other similar volatile metals consisting in building up the charge outside the ovens in the form of briquettes, stacking said briquettes in the form of a cake of smaller dimensions than the oven, surrounding said cake on the sides which make contact with the oven with carbon bricks, pushing such charge into the oven and subjecting it to the distillation operation and discharging the distilled charge by applying a pusher ram to one end of the carbon envelope and pushing said charge bodily onto a receiving station, maintaining the carbon envelope in a fixed condition on said receiving station and tilting said envelope to remove the residue of the distillation operation.

4. A method of operating large dimension ovens for the reduction of zinc and other similar volatile metals consisting in building up the charge outside the ovens in the form of briquettes, stacking said briquettes in the form of a cake of smaller dimensions than the oven, surrounding said cake on the sides which make contact with the oven with carbon bricks, pushing such charge into the oven and subjecting it to the distillation operation and discharging the distilled charge by applying a pusher ram to one end of the carbon envelope and pushing said charge bodily onto a receiving station, maintaining the carbon envelope in a fixed condition on said receiving station and tilting said envelope to remove the residue of the distillation operation, blowing into a shaft furnace or kiln such residue of distillation that is in the form of cakes or pieces to obtain the remainder of zinc as zinc oxide and such other metals that may be contained in said residue pieces.

5. A process for the burning of marl, dolomite, magnesite and the like and for the distilling of mine-washings, characterized by these fine-grained substances being filled into a receptacle built up from bricks and having the dimensions of the oven chamber, and pushed into the oven within this receptacle and heated, whereupon the residue is removed by pushing out the receptacle with its contents.

6. A process for the reduction of ores containing volatile metals, which consists in forming a unitary and movable oven-charge comprising such ore within an enclosure of carbon, and introducing such charge into an oven, and distilling off the metal in volatile form.

7. A process for the reduction of ores containing volatile metals, which consists in forming a unitary and movable oven-charge comprising such ore within an enclosure of carbon, and introducing such charge into an oven, and distilling off the metal in volatile form, and removing the remainder of said charge as a unit.

8. A process for the reduction of ores containing volatile metals, which consists in forming a unitary and movable oven-charge comprising such ore within an enclosure of carbon, and introducing such charge into an oven, and distilling off the metal in volatile form, and removing the remainder of said charge as a unit, and emptying the ashes out of the said carbon enclosure while maintaining said carbon unmixed with the ashes.

9. A process for the reduction of ores containing volatile metals, which consists in forming a unitary and movable oven-charge comprising such ore within an enclosure of carbon, and introducing such charge into an oven, and distilling off the metal in volatile form, and removing the remainder of said charge as a unit, and tilting the same to pour out the ashes while maintaining said carbon as a receptacle for repeated use.

10. A process as described in claim 1, and then treating the distillation residue of the ore with heat and obtaining the residue of the metal or metals in metallic form.

11. A process for the burning or distillation of finely divided substances, consisting in building up from separate bricks a fire-resisting receptacle of a size suitable to be introduced into an oven chamber, and placing the charge of said substance or substances in said receptacle, and introducing the same into the oven, and treating the same with heat, and removing said receptacle and residue of the charge as a unit from the oven.

12. A method of operating large dimension ovens for the reduction of zinc and other similar volatile metals consisting in building up the charge outside the ovens in the form of briquettes, stacking said briquettes in the form of a cake of smaller dimensions than the oven, surrounding said cake on the sides which make contact with the oven with carbon bricks, pushing such charge into the oven and subjecting it to the distillation operation and discharging the distilled charge by applying a pusher ram to one end of the carbon envelope and pushing said charge bodily onto a receiving station, maintaining the carbon envelope in a fixed condition on said receiving station and tilting said envelope to remove the residue of the distillation operation, blowing into a shaft furnace or kiln such residue of distillation that is in the form of cakes or pieces, together with additional coke and heated air, to obtain the remainder of zinc as zinc oxide and such other metals that may be contained in said residue pieces.

HEINRICH KOPPERS.